W. SOUTHWORTH.
Photographic Camera.
No. 35,635.
5 Sheets—Sheet 1.
Patented June 17, 1862.
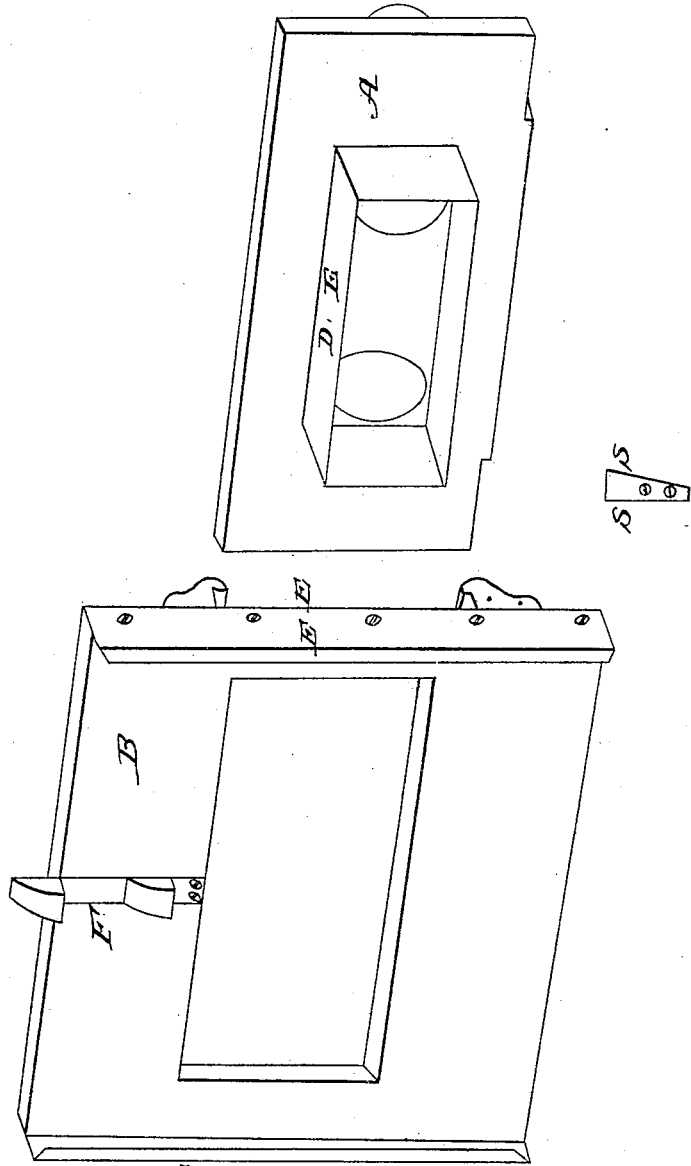

W. SOUTHWORTH.
Photographic Camera.
No. 35,635.
5 Sheets—Sheet 2.
Patented June 17, 1862.
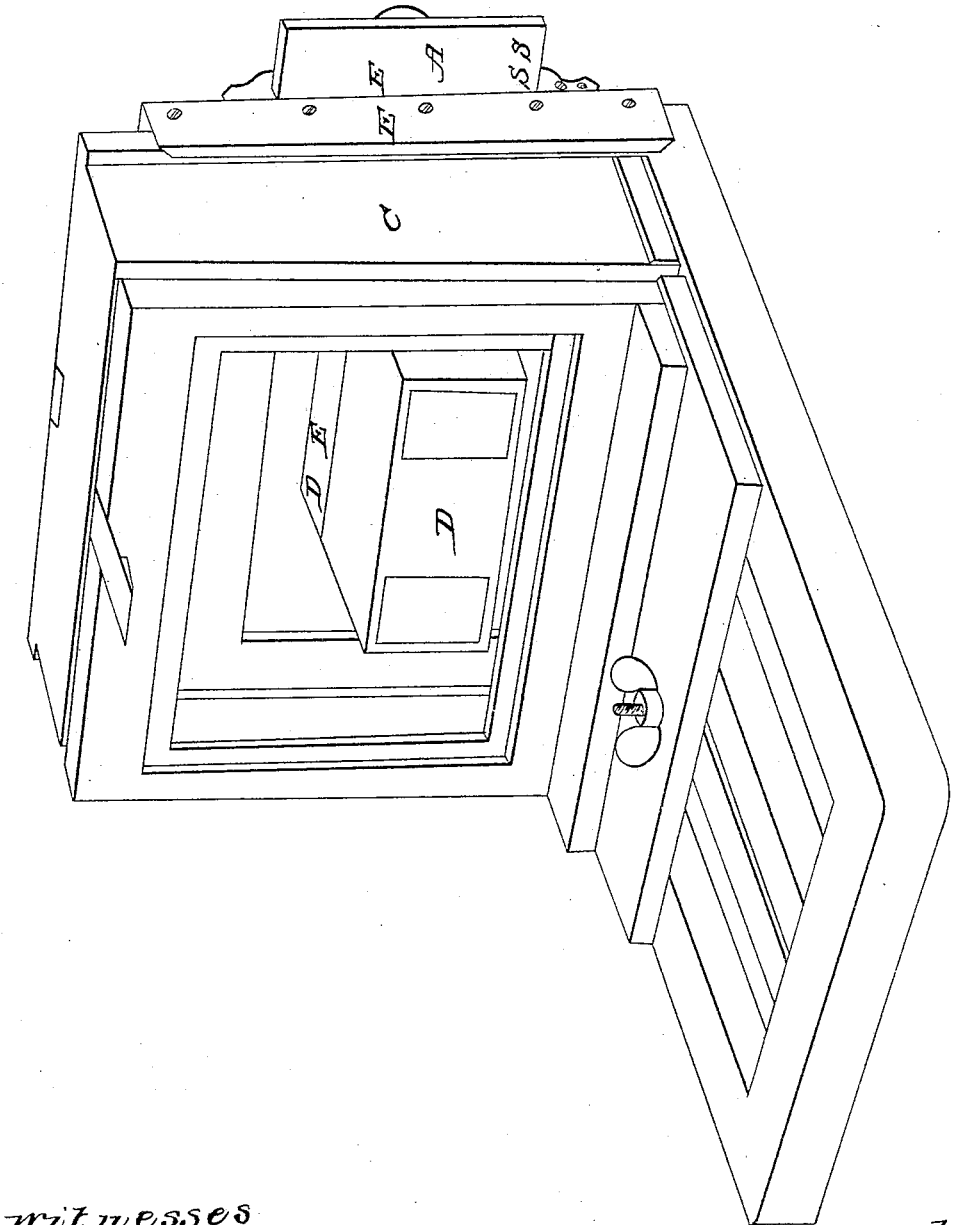
witnesses
R. C. Cheysman
D. W. Thoms
Inventor
Wm Southworth W. SOUTHWORTH.
Photographic Camera.
No. 35,635.
5 Sheets—Sheet 3.
Patented June 17, 1862.
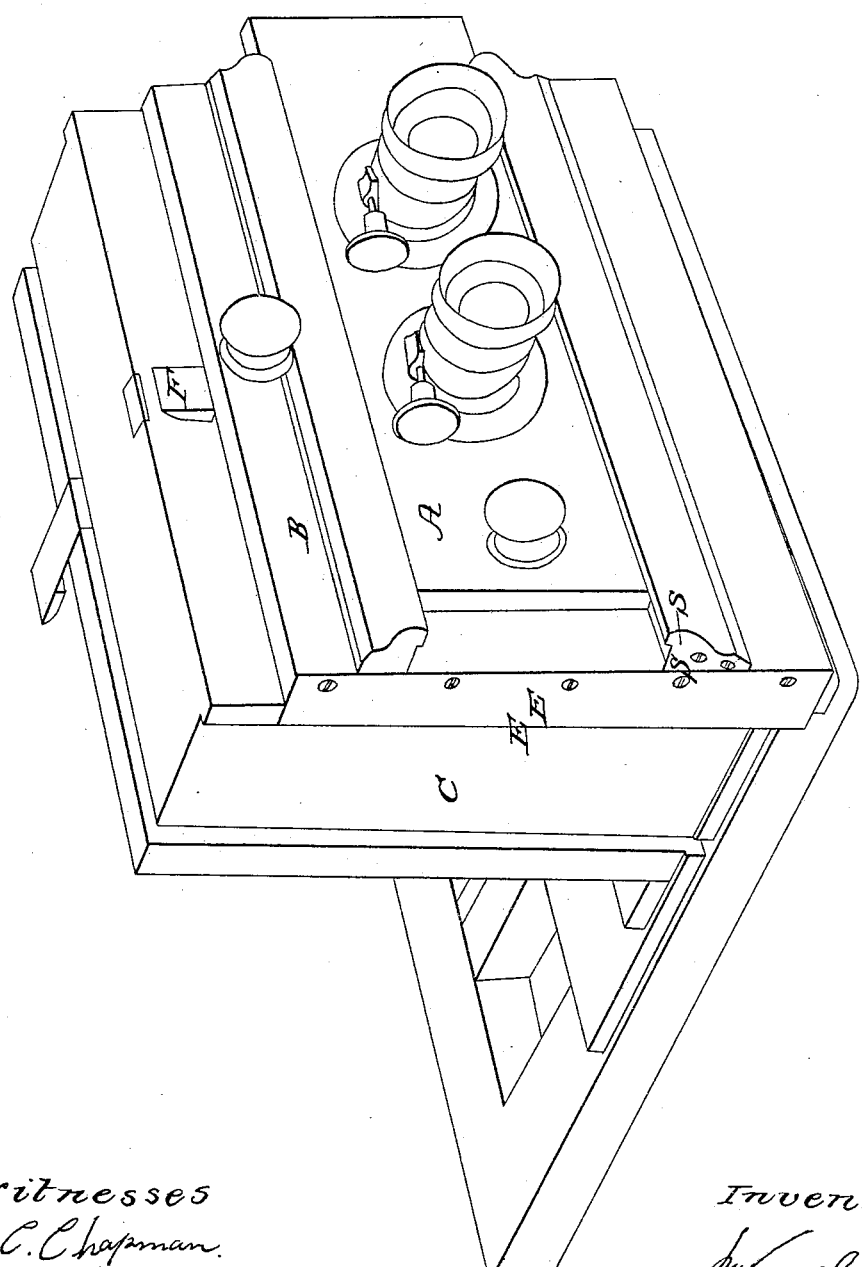
Witnesses
R. C. Chapman.
D. W. Thomas.
Inventor
Wm Southworth.

W. SOUTHWORTH.
Photographic Camera.
No. 35,635.
5 Sheets—Sheet 4.
Patented June 17, 1862.
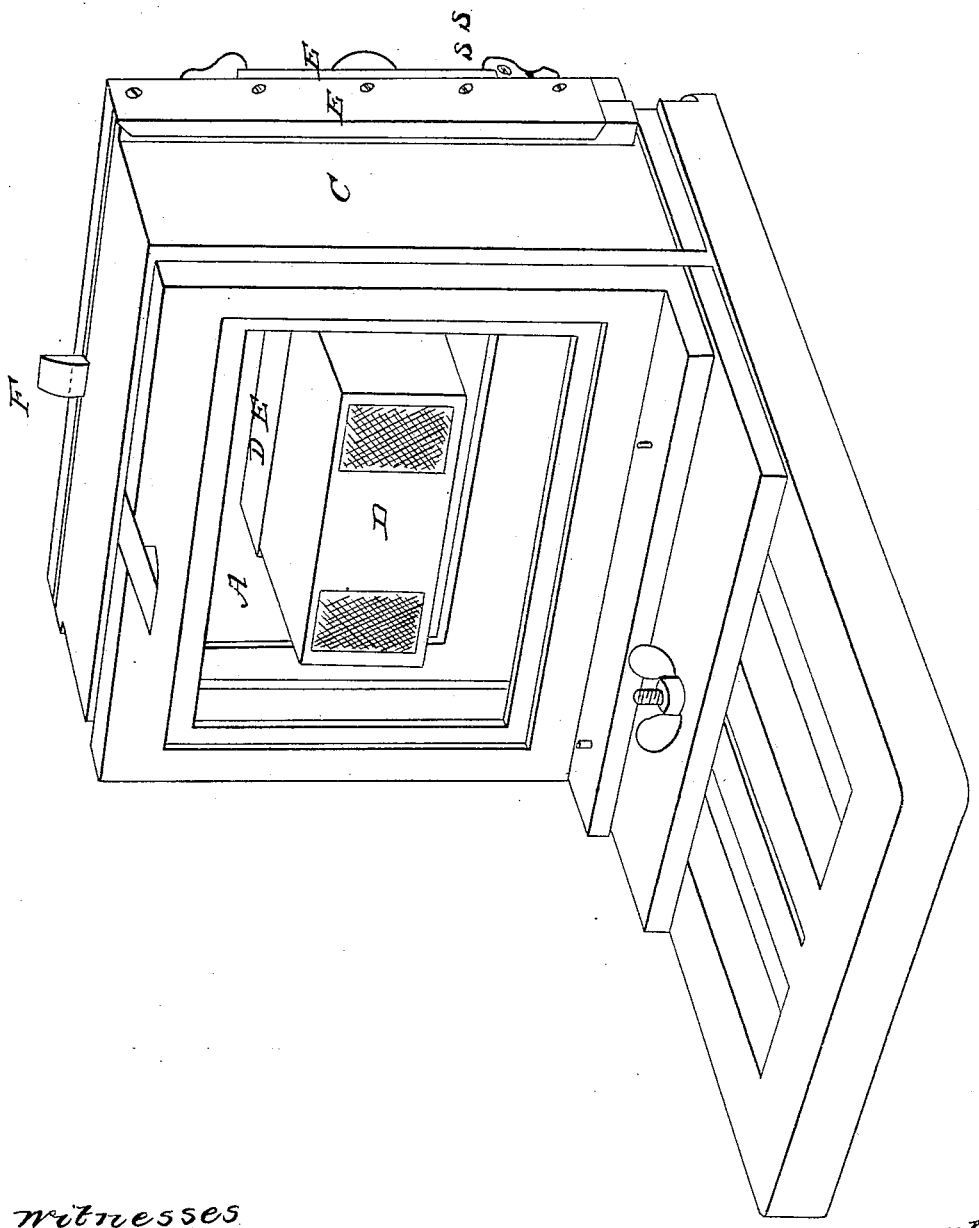

W. SOUTHWORTH.
Photographic Camera.
No. 35,635.
5 Sheets—Sheet 5.
Patented June 17, 1862.
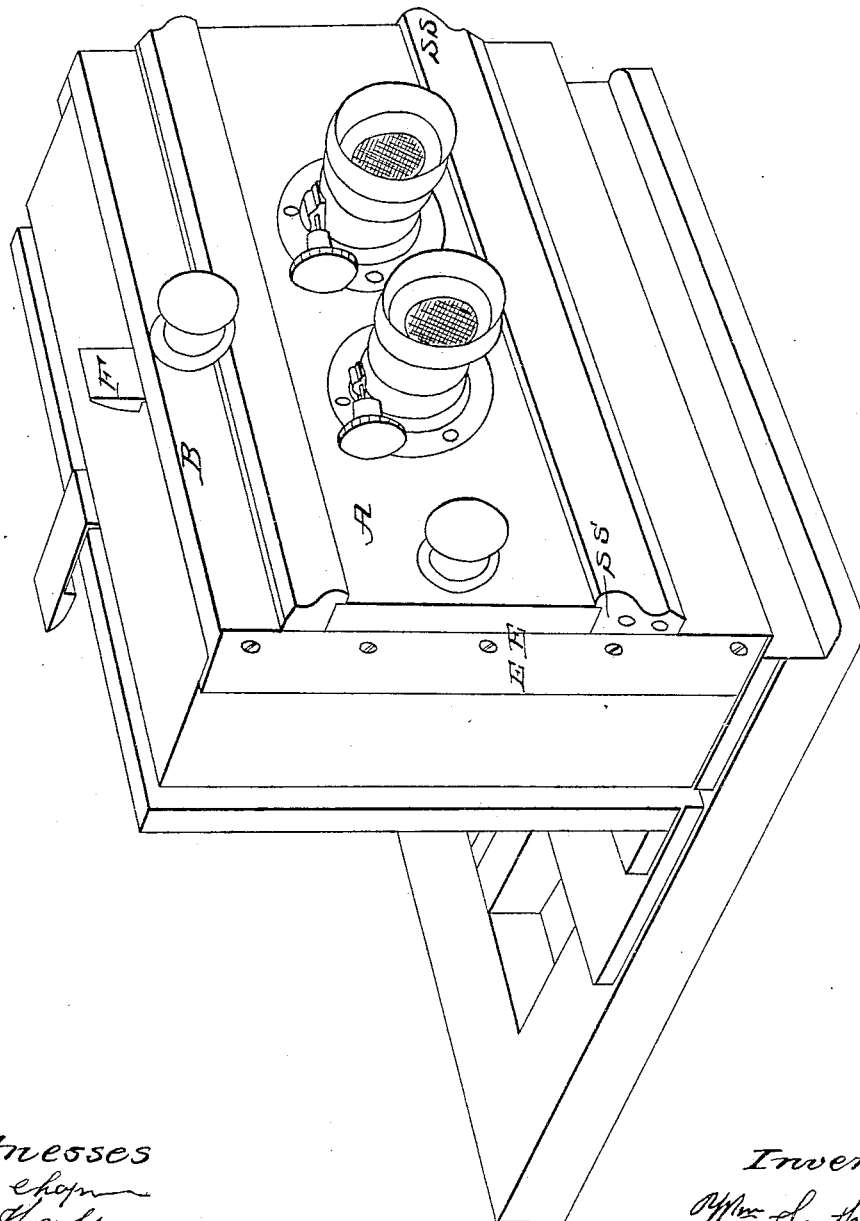
Witnesses
R. C. Chap—
D. W. Thumbs.
Inventor
Wm Southworth.

UNITED STATES PATENT OFFICE.

WILLIAM SOUTHWORTH, OF NEW CASTLE, MAINE.

MULTIPLYING-CAMERA.

Specification forming part of Letters Patent No. 35,635, dated June 17, 1862.

*To all whom it may concern:*

Be it known that I, WILLIAM SOUTHWORTH, of New Castle, in the county of Lincoln and State of Maine, have invented a new and Improved Multiplying-Camera; and I do hereby declare that the following is a full and exact description thereof, reference being had to the accompanying drawings, and to the letters of reference marked thereon.

The nature of my invention consists in the movement of the tube-lenses from one side of the camera to the other, also raising or lowering the same in order to bring the picture upon different portions of the plate with the aid of a partitioned box for a diaphragm which moves with the lens.

Plate 1 is a perspective view of the front of the camera-box C, the lenses being raised one catch. Plate 2 is a perspective view of the back side of the camera C, showing the diaphragm D placed in its socket D E. Plate 3 is a perspective view of front of the camera C, showing the slide A, to which the lenses and diaphragm-socket D E are secured, slid to one side and dropped down. Plate 4 is a perspective view of back side of the camera C with the lenses in the same position, as described in Plate 3, showing the position of diaphragm D and socket D E. Plate 5 shows the slide A, upon which the lenses are secured; also the socket D E for the diaphragm D; also the form of the lower corners of the slide A, being formed so that when slid to either side of the camera C it will move but a given distance to the stops S S, as seen upon Plates 1, 2, 3, and 4. Plate 5 also shows the holder B of the slide A; also its slides E E, by which the holder B is secured to the camera-box C, and can be raised up and held in its place by means of catches F.

The diaphragm D has a partition when more than one lens is used, and when placed in its socket D E moves with the lenses, and the light cannot reach the plate (upon which the picture is taken) except through the aperture intended for the size of the picture. The diaphragm D can be partially drawn out or slid back at the will of the operator.

The operation of my invention is as follows, viz: The ground glass being placed in its socket, the holder B is raised one catch and the slide A is slid so as to bring the diaphragm D as near to the center of the camera as possible. Here the focus is taken, the lenses are covered, the ground glass removed, and the plate-holder, containing the sensitive plate, placed in its stead. The lenses are now uncovered and the sensitive plate exposed and the lenses re-covered. The slide A is now slid to one side of the camera C and the lenses again exposed and re-covered. It is then slid to the other side. The holder B is now raised upon the next catch, and the same movements with the slide continued as before. The holder B is then dropped down and the same movements continued, as before described.

I claim—

1. The device for moving the lenses, as herein described—viz., the raising or lowering the lenses by means of holder B and catches F.

2. Moving the lenses from one side of the camera C to the other to stops S S by means of slide A.

3. The manner of excluding the light from the sensitive plate by the use of the partitioned box or diaphragm D.

4. The manner of constructing the same so that it can be partially drawn out or slid back at pleasure.

WM. SOUTHWORTH.

Witnesses:
   M. L. M. HUSSEY,
   R. C. CHAPMAN.